United States Patent
Asazu et al.

(10) Patent No.: US 7,679,351 B2
(45) Date of Patent: Mar. 16, 2010

(54) POWER SUPPLY APPARATUS

(75) Inventors: Hiroaki Asazu, Kyoto (JP); Kunihiro Komiya, Kyoto (JP)

(73) Assignee: Rohm Co., Ltd. (JP)

( * ) Notice: Subject to any disclaimer, the term of this patent is extended or adjusted under 35 U.S.C. 154(b) by 277 days.

(21) Appl. No.: 11/810,737

(22) Filed: Jun. 7, 2007

(65) Prior Publication Data

US 2008/0007322 A1    Jan. 10, 2008

(30) Foreign Application Priority Data

Jun. 7, 2006    (JP)    ............... 2006-158918

(51) Int. Cl.
*G05F 1/40*    (2006.01)
(52) U.S. Cl. ...................... 323/287; 315/291
(58) Field of Classification Search ......... 323/282–288, 323/222, 272, 224, 290, 266; 327/89, 108; 315/77, 121, 157, 209 R, 291, 169.3, 224, 315/225, 307; 307/10.1, 30, 131; 363/59, 363/62

See application file for complete search history.

(56) References Cited

U.S. PATENT DOCUMENTS

| 5,731,694 A | * | 3/1998 | Wilcox et al. ............... 323/287 |
| 7,307,385 B2 | * | 12/2007 | Yamamoto et al. .......... 315/224 |

FOREIGN PATENT DOCUMENTS

JP    2001-223095    8/2001

* cited by examiner

*Primary Examiner*—Rajnikant B Patel
(74) *Attorney, Agent, or Firm*—Cantor Colburn LLP

(57) ABSTRACT

A voltage generation unit generates a driving voltage for driving an LED. A first feedback path feeds back a voltage according to a voltage at one end of the LED. A second feedback path feeds back a voltage according to a voltage at the other end of the LED. A current driving circuit is provided on a path on which the voltage generation unit drives the LED. A control circuit controls the voltage generation unit so that one of first and second feedback voltages fed back by the first and second feedback paths, respectively is closer to a predetermined reference voltage.

16 Claims, 2 Drawing Sheets

POWER SUPPLY APPARATUS

BACKGROUND OF THE INVENTION

1. Field of the Invention

The present invention relates to a power supply apparatus.

2. Description of the Related Art

A small-sized information terminal such as a recent cellular telephone or a PDA (personal digital assistance) includes a device, for example, an LED (light emitting diode) employed as a backlight of a liquid crystal, that needs higher voltage than a voltage output from a battery. For example, a lithium-ion (Li-ion) battery is often employed in a small-sized information terminal of this type. A voltage output is generally about 3.5 volts (V) and the voltage output from the Li-ion battery even when the Li-ion battery is fully charged is as low as about 4.2 V. The LED needs a voltage higher than the battery voltage as a driving voltage. In this way, if the higher voltage than the battery voltage is required, the voltage necessary to drive a load circuit such as the LED is obtained by boosting the battery voltage using a switching regulator or a booster circuit such as a charge pump circuit (see Japanese Patent Application Laid-Open No. 2001-223095).

Meanwhile, a control circuit controls a boosting operation performed by such a booster circuit by feeding back a voltage at a certain terminal on the load circuit to the control circuit so that the load circuit can stably operate. For example, to drive the LED, the following method may be considered. A constant current source for driving the LED is connected to a cathode terminal of the LED, and the control circuit controls the cathode terminal so that a voltage at the cathode terminal is kept to a constant value (=Vx) while maintaining the brightness of the LED. The voltage Vx is decided so as not to saturate the constant current source. At this time, the voltage at the cathode terminal is fed back to the control circuit of the booster circuit, whereby the control circuit controls the booster circuit so that the voltage at the cathode terminal coincides with the voltage Vx.

Under these circumstances, the inventor of the present invention has recognized the following problems. According to the conventional method, a voltage at an anode terminal of the LED, that is, an output voltage of the booster circuit is stabilized to Vf+Vx while the constant current circuit applies current to the LED, where Vf is a forward voltage flowing through the LED.

When the LED is switched to an off state, the output voltage gradually lowers if a discharge path from an output capacitor of the booster circuit is present besides the LED. If no other discharge path than the LED is present, then electric charges are held in the output capacitor, and the output voltage is kept almost constant. Namely, the output voltage is according to a load state, that is, variable. If the output voltage is variable, the variable output voltage may possibly influence functions of the other circuits such as short-circuit detection and protection circuits. As a result, the booster circuit disadvantageously turns unstable as a whole.

SUMMARY OF THE INVENTION

The present invention has been achieved to solve the above-stated problems. It is a general purpose of the present invention to provide a power supply apparatus capable of stably operating regardless of an operating state of a load.

A power supply apparatus according to one embodiment of the present invention includes: a voltage generation unit generating a driving voltage for driving a load; a first feedback path feeding back a voltage according to a voltage at one end of the load; a second feedback path feeding back a voltage according to a voltage at the other end of the load; and a control circuit controlling the voltage generation unit so that one of a first feedback voltage and a second feedback voltage fed back by the first feedback path and the second feedback path, respectively is closer to a predetermined reference voltage.

According to one embodiment of the present invention, even if a load driving state changes, the driving voltage is stabilized by one of the first and second feedback paths. Therefore, it is possible to prevent the circuit from becoming unstable.

A power supply apparatus according to another embodiment of the present invention includes: a voltage generation unit generating a driving voltage for driving a load; a current driving circuit provided on a path on which the voltage generation unit drives the load; a first feedback path feeding back a first feedback voltage according to the driving voltage; a second feedback path feeding back a second feedback voltage according to a voltage at a connection point between the current driving circuit and the load; and a control circuit controlling the voltage generation unit so that one of the first feedback voltage and the second feedback voltage fed back by the first feedback path and the second feedback path, respectively is closer to a predetermined reference voltage.

According to another embodiment of the present invention, even in a state in which the current driving circuit is turned off and the second feedback path is inactive, the driving voltage output from the voltage generation unit is stabilized based on the first feedback voltage. Therefore, it is possible to prevent the circuit from becoming unstable.

The control circuit may control the voltage generation unit so that a lower voltage of the first feedback voltage and the second feedback voltage is closer to the predetermined reference voltage. In this case, the driving voltage is ensured to be higher than a certain value, so that it is possible to prevent the driving voltage from lowering and thereby the circuit from becoming unstable.

The control circuit may include an error amplifier amplifying an error between one of the first feedback voltage and the second feedback voltage and the reference voltage, and may adjust the driving voltage so that the error is closer to zero. The error amplifier may include two input differential pairs, the reference voltage and the first feedback voltage may be input to one of the two input differential pairs, and the reference voltage and the second feedback voltage may be input to other input differential pair.

In this case, the driving voltage can be stabilized based on the first and second feedback voltages by using the two differential pairs.

The first feedback path may include a constant current circuit generating a predetermined constant current; and a voltage drop circuit provided between the constant current circuit and the voltage generation unit, and generating a voltage drop according to the constant current. This first feedback path feeds back the voltage at the connection point between the constant current circuit and the voltage drop circuit as the first feedback voltage.

In this case, while the first feedback path is active, the driving voltage can be stabilized to a sum of the voltage drop across the voltage drop circuit and the reference voltage.

The voltage drop circuit may include a diode arranged on a path of the constant current so that a cathode of the diode is on a low voltage side. Furthermore, the voltage drop circuit may include a resistor provided on a path of the constant current.

By adjusting the number of diodes and resistance, a target value of the driving voltage can be adjusted while the first feedback path is active.

The first feedback path may include a first resistor and a second resistor connected in series between an output terminal of the voltage generation unit and a fixed voltage terminal, and the first feedback path feeds back a voltage divided by the first resistor and the second resistor as the first feedback voltage.

In this case, while the first feedback path is active, the driving voltage can be stabilized to the voltage value obtained by dividing the reference voltage by a resistance voltage division ratio.

In a certain embodiment of the present invention, the voltage generation unit may include a charge pump circuit; and a regulator circuit regulating an input voltage or an output voltage of the charge pump circuit. The control circuit may adjust a control voltage for controlling a transistor of the regulator circuit so that one of the first feedback voltage and the second feedback voltage is closer to the reference voltage.

In a certain embodiment of the present invention, the voltage generation unit may include a switching regulator circuit. The control circuit may adjust a duty ratio of ON/OFF state of a switching transistor of the switching regulator circuit so that one of the first feedback voltage and the second feedback voltage is closer to the reference voltage.

In a certain embodiment of the present invention, at least the current driving circuit, the first feedback path, the second feedback path, and the control circuit may be integrated on one semiconductor substrate. The term "integration" includes an instance in which all the constituent elements of a circuit are formed on one semiconductor substrate and an instance in which main constituent elements thereof are integrated. Part of the constituent elements such as a resistor and a capacitor may be provided outside of the semiconductor substrate for adjusting circuit constants.

According to still another embodiment of the present invention, there is provided an electronic device. The electronic device includes a light emitting element, and the above-mentioned power supply apparatus driving the light emitting element as the load.

According to still another embodiment of the present invention, it is possible to prevent the driving voltage from becoming unstable when a brightness of the light emitting element is changed.

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described based on preferred embodiments which do not intend to limit the scope of the present invention but exemplify the invention. All of the features and the combinations thereof described in the embodiments are not necessarily essential to the invention.

Figure 1:
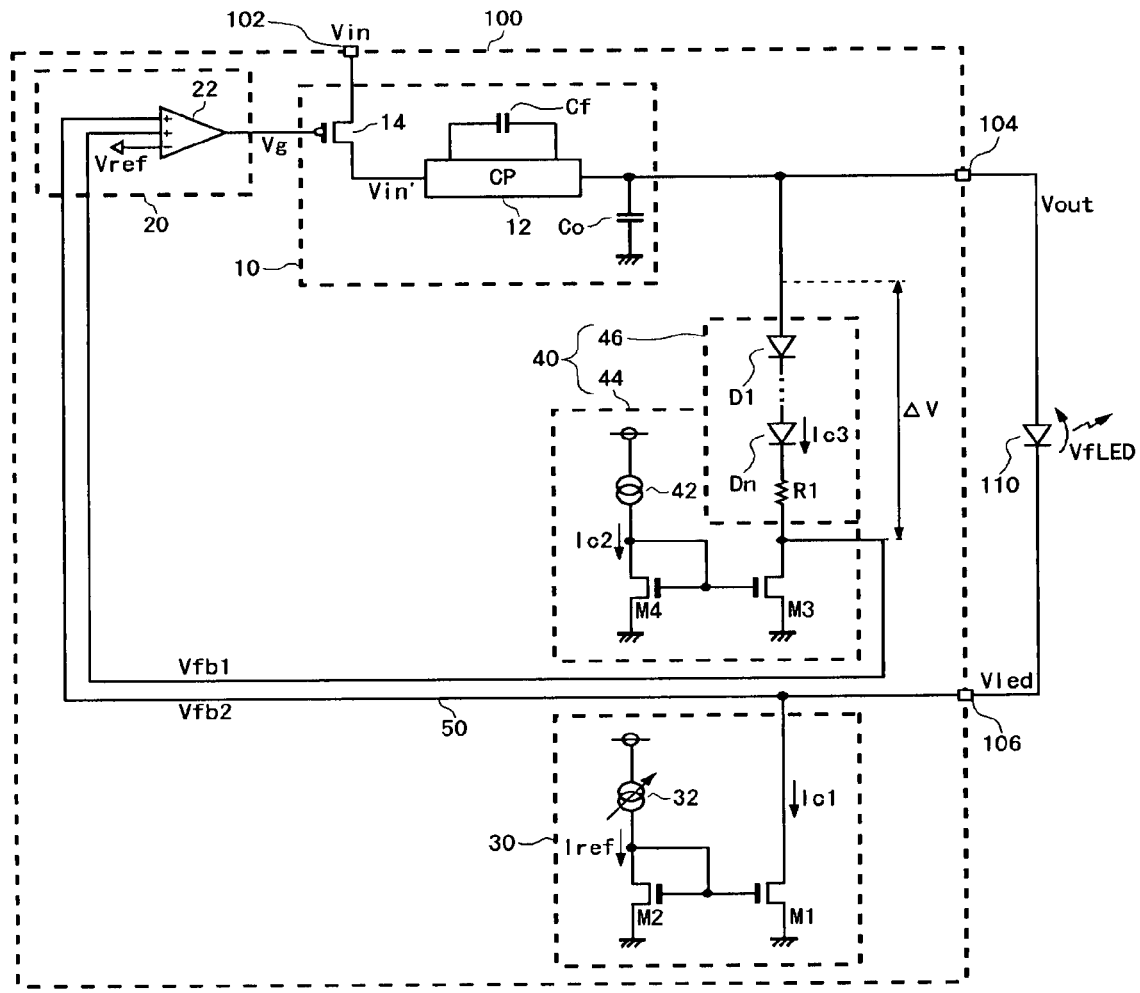
FIG. 1 is a circuit diagram showing a configuration of a power supply apparatus according to an embodiment of the present invention.

FIG. 1 is a circuit diagram showing a configuration of a power supply apparatus 100 according to an embodiment of the present invention. The power supply apparatus 100, which is a boosting power supply for driving an LED 110 that serves as a load circuit, boosts an input voltage Vin output from a battery and generates a driving voltage for driving the LED 110. The power supply apparatus 100 and the LED 110 are mounted in an electronic device such as a cellular telephone terminal, and function as a light emitting apparatus as a whole. The LED 110 is used as, for example, a backlight of a liquid crystal or an incoming alert light.

The power supply apparatus 100 includes an input terminal 102, an output terminal 104, and an LED terminal 106. The power supply apparatus 100 boosts the input voltage Vin applied to the input terminal 102 and outputs the boosted input voltage as a driving voltage Vout from the output terminal 104. An anode of the LED 110 serving as the load is connected to the output terminal 104, and a cathode thereof is connected to the LED terminal 106. The power supply apparatus 100 adjusts a brightness of the LED 110 by controlling electric current flowing through the LED 110.

The power supply apparatus 100 includes a voltage generation unit 10, a control circuit 20, a current driving circuit 30, a first feedback path 40, and a second feedback path 50.

The voltage generation unit 10 generates the driving voltage Vout for driving the LED 110 serving as the load. In this embodiment, the voltage generation unit 10 includes a charge pump circuit 12, and a flying capacitor Cf and an output capacitor Co are connected to the charge pump circuit 12. The charge pump circuit 12 includes a plurality of switch elements connected to the flying capacitor Cf and the output capacitor Co. The charge pump circuit 12 outputs the voltage obtained by boosting the input voltage Vin' by repeating a period where flying capacitor Cf is charged and a period where a charge accumulated in the flying capacitor Cf is transferred to the output capacitor Co.

An adjusting transistor 14 is provided on a path from the input terminal 102 of the power supply apparatus 100 to an input terminal of the charge pump circuit 12. The adjusting transistor 14, which is a P channel MOSFET, has a source connected to the input terminal 102 and a drain connected to the input terminal of the charge pump circuit 12. A control voltage Vg output from the control circuit 20 is applied to a gate of the adjusting transistor 14. The control voltage Vg is to adjust a degree of turning on the adjusting transistor 14, and the voltage Vin' dropped from the input voltage Vin is supplied to the charge pump circuit 12. It is to be noted that the adjusting transistor 14 may be provided on a load side of the charge pump circuit 12.

The current driving circuit 30 is provided on a load driving path. Specifically, the current driving circuit 30 is provided between the cathode of the LED 110, that is, the LED terminal 106 and a ground, that is, a fixed voltage terminal. The current driving circuit 30 generates a constant current Ic1 to adjust an electric current to be flown through the LED 110.

The current driving circuit 30 according to the embodiment includes a first transistor M1, a second transistor M2, and a variable current source 32. The variable current source 32 generates an electric current Iref according to the brightness of the LED 110. The transistor M2 is provided on a path of the variable current source 32. The transistor M1 is connected to the transistor M2 to form a current mirror circuit, and a current Ic1 that is a predetermined multiple of the current Iref is flown through the transistor M1. The current Ic1 is applied to the LED 110.

The power supply apparatus 100 according to the embodiment includes two feedback paths, that is, the first feedback path 40 and the second feedback path 50. The first feedback path 40 feeds back a first feedback voltage Vfb1 according to the driving voltage Vout output from the voltage generation unit 10. The second feedback path 50 feeds back a voltage at a connection point between the current driving circuit 30 and the load or LED 110, that is, a voltage at the LED terminal 106. While the second feedback path 50 is simply an interconnect wire in the embodiment, it may be a voltage divider circuit including a resistor.

From another viewpoints of the power supply apparatus 100 according to the embodiment, the first feedback path 40 feeds back the first feedback voltage Vfb1 according to the voltage Vout at one end (anode) of the LED 110 serving as a load whereas the second feedback path 50 feeds back a voltage Vled at the other end (cathode) of the LED 110 serving as the load.

The first feedback path 40 includes a constant current circuit 44 and a voltage drop circuit 46. The constant current circuit 44 generates a predetermined constant current Ic3. The voltage drop circuit 46, which is provided on a path of the constant current Ic3 between the constant current circuit 44 and an output terminal of the voltage generation unit 10, generates a voltage drop $\Delta V$ according to the constant current Ic3. The first feedback pat 40 feeds back the voltage at a connection point between the constant current circuit 44 and the voltage drop circuit 46 as the first feedback voltage Vfb1.

The constant current circuit 44 includes a current source 42 and transistors M3 and M4. The current source 42 generates a constant current Ic2. The transistor M4 is provided on a path of the current source 42. The transistor M3 is connected to the transistor M4 to form a current mirror circuit, and a current Ic3 that is a predetermined multiple of the constant current Ic2 is flown through the transistor M3. The constant current circuit 44 is configured to be similar in type to the current driving circuit 30.

The voltage drop circuit 46 includes a resistor R1 and n (where n is an integer) diodes D1 to Dn. The diodes D1 to Dn and the resistor R1 are connected in series between the output terminal 104 of the power generation unit 100 and a connection point between the constant current circuit 44 and the voltage drop circuit 46 (that is, a drain of the transistor M3). The current Ic3 in the transistor M3 is flown through the diodes D1 to Dn and the resistor R1, and the voltage drop $\Delta V$ is generated. The voltage drop $\Delta V$ is represented by the following equation.

$$\Delta V = R1 \times Ic3 + Vf \times n$$

In the equation, R1 indicates a resistance of the resistor R1 and Vf indicates a forward voltage of each of the diodes D1 to Dn. The first feedback path 40 feeds back a drain voltage of the transistor 3 as the first feedback voltage Vfb1. The relationship between the first feedback voltage Vfb1 and the driving voltage Vout is represented by the following equation.

$$Vfb1 = Vout - \Delta V = Vout - (R1 \times Ic3 + Vf \times n)$$

In the equation, Ic3, Vf, and n are regarded as constants, therefore, the first feedback voltage Vout is according to the driving voltage Vout. The first feedback path 40 may be configured to eliminate the resistor or the diodes D1 to Dn.

The first feedback voltage Vfb1 and the second feedback voltage Vfb2 are input to the control circuit 20. In the embodiment, the control circuit 20 includes an error amplifier 22. The first feedback voltage Vfb1 and the second feedback voltage Vfb2 fed back by the first feedback path 40 and the second feedback path 50, respectively are input to the control circuit 20. The control circuit 20 controls the voltage generation unit 10 so that one of the first feedback voltage Vfb1 and the second feedback voltage Vfb2 is closer to a predetermined reference voltage Vref. In the embodiment, the error amplifier 22 of the control circuit 20 adjusts a gate voltage of the adjusting transistor 10.

In a certain embodiment of the invention, the control circuit 20 controls the voltage generation unit 10 so that the lower voltage of the first feedback voltage Vfb1 and the second feedback voltage Vfb2 is closer to the predetermined reference voltage Vref. Specifically, the error amplifier 22 amplifies an error between the reference voltage Vref and one of the first feedback voltage Vfb1 and the second feedback voltage Vfb2, thereby adjusting the gate of the adjusting transistor 14. Furthermore, the degree of turning on the adjusting transistor 14 is adjusted so that the error between the lower voltage of the first feedback voltage Vfb1 and the second feedback voltage Vfb2 and the reference voltage Vref becomes zero by feedback operation. Alternatively, in one embodiment, the degree of turning on the adjusting transistor 14 may be adjusted based not on the lower voltage of the first feedback voltage Vfb1 and the second feedback voltage Vfb2 but on one of the first feedback voltage Vfb1 and the second feedback voltage Vfb2 selected by an instruction from outside.

Figure 2:
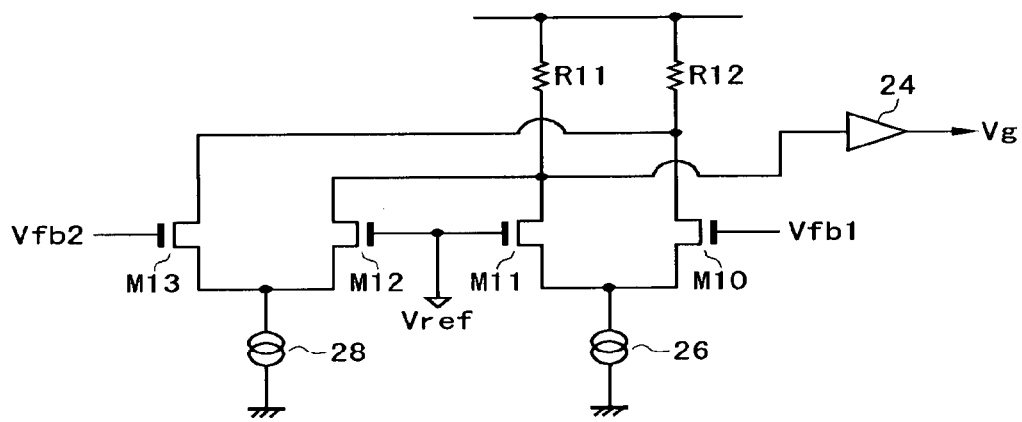
FIG. 2 is a circuit diagram showing a configuration of an error amplifier.

FIG. 2 is a circuit diagram showing a configuration of the error amplifier 22. The error amplifier 22 includes two differential pairs. A first differential pair includes transistors M10 and M11 and a second differential pair includes transistors M12 and M13. Resistors R11 and R12 are provided as a common load to the first and second differential pairs. The resistors R11 and R12 may be a current-mirror load. Further, current sources 26 and 28 are provided to correspond to the first and second differential pairs, respectively. An amplification stage 24 outputs a voltage at a connection point between the resistor R11 and the transistor M11 as the control voltage Vg. The reference voltage Vref is applied to a gate of each of the transistors M11 and M12, and the first feedback voltage Vfb1 and the second feedback voltage Vfb2 are applied to gates of the respective transistors M10 and M13.

Alternatively, the error amplifier 22 may be configured so that the current sources 26 and 28 are provided on a power supply side and the loads R11 and R12 are provided on a ground side.

With the configuration of the error amplifier 22 shown in FIG. 2, the error voltage between the lower voltage of the first feedback voltage Vfb1 and the second feedback voltage Vfb2 and the reference voltage Vref can be amplified.

The configuration of the power supply apparatus 100 has been described so far. Operation performed by the power supply apparatus 100 configured as stated above will next be described.

The control circuit 20 controls the voltage generation unit 10 so that the error between one of the first feedback voltage Vfb1 and the second feedback voltage Vfb2 and the reference voltage Vref is closer to zero, thereby stabilizing the driving voltage Vout.

As stated, the control circuit 20 compares the lower voltage of the first feedback voltage Vfb1 and the second feedback voltage Vfb2 with the reference voltage Vref. Accordingly, the path that feeds back the lower voltage is active and the path that feeds back the higher voltage is inactive.

If $Vfb1<Vfb2$ holds, the first feedback path 40 is active. While the first feedback path 40 is active, the first feedback voltage Vfb1 is fed back so as to be closer to the reference voltage Vref. As a result, the driving voltage Vout is adjusted to coincide with a target value represented by the following equation.

$$Vout=Vref+\Delta V=Vref+(R1\times Ic3+Vf\times n)$$

Because the resistance R1, the constant current Ic3, and the integer n can be changed according to design, the target value of the driving voltage Vout relative to the first feedback path 40 can be adjusted. The forward voltage of the diode is a physical property value and quite small in variation. Due to this, an irregularity in voltage drop $\Delta V$ is small. As a result, an irregularity in driving voltage Vout can be reduced as compared with an instance in which the first feedback path 40 is configured as a resistance voltage dividing circuit to be described later. In case of the resistance voltage dividing circuit to be described later, the target value of the driving voltage is set according to a ratio of two resistances. Due to this, the product of errors of the two resistances is reflected in the target value.

In case of $Vfb1>Vfb2$, the second feedback path 50 is active. While the second feedback path 50 is active, the second feedback voltage Vfb2 is fed back so that second feedback voltage Vfb2, that is, the voltage Vled at the cathode of the LED 110 is closer to the reference voltage Vref. In this case, the driving voltage Vout is represented by the following equation.

$$Vout=Vref+VfLED$$

In the equation, VfLED indicates a voltage drop across the LED 110 and the voltage drop VfLED changes according to the driving current Ic1, that is, the emission brightness of the LED 110.

In the power supply apparatus 100 according to the embodiment, even in a state in which the driving current Ic1 is not applied to the LED 110, the first feedback path 40 feeds back the first feedback voltage Vfb1. It is, therefore, possible to stabilize the driving voltage Vout to a predetermined value. Moreover, as a result of stabilizing the driving voltage Vout, it is possible to prevent a circuit block, not shown, for monitoring the driving voltage Vout, for example, a short-circuit protection circuit from malfunctioning.

Furthermore, even in a state in which the LED 110 is not turned on (Ic3≈0), time for the voltage generation unit 10 to raise the driving voltage Vout again is unnecessary when the LED 110 is switched from an OFF-state to an ON-state because the driving voltage Vout is stabilized to the certain value. Therefore, the LED 110 can be turned on instantly at desired timing.

Moreover, the control circuit 20 performs feedback control based on the lower voltage of the first feedback voltage Vfb1 and the second feedback voltage Vfb2. Accordingly, no situation occurs that the second feedback voltage Vfb2 falls below the reference voltage Vref and the transistor M1 of the current driving circuit 30 does not saturate. The control circuit 20 can, therefore, supply, as the driving current Ic1, the current proportional to the reference current Iref. This can ensure that the brightness of the LED 110 is set to a desired value.

The above-stated embodiment is given only for illustrative purposes. Those skilled in the art could readily understand that various modifications can be made of constituent elements and combinations of processing processes, and that such modifications fall within the scope of the present invention.

As an alternative, the first feedback path 40 may be configured as the resistance voltage dividing circuit. In this case, the first feedback path 40 is configured to include a first resistor and a second resistor connected in series between the output terminal of the voltage generation unit 10 and a ground terminal thereof. The first feedback path 40 feeds back a voltage divided by two resistances as the first feedback voltage Vfb1. As a result, if a voltage division ratio is "a", the driving voltage Vout is stabilized to Vref/a (Vout=Vref/a) while the first feedback path 40 is active. If the first feedback path 40 is configured to include the resistors, it is advantageously possible to make a circuit area smaller.

Figure 3:
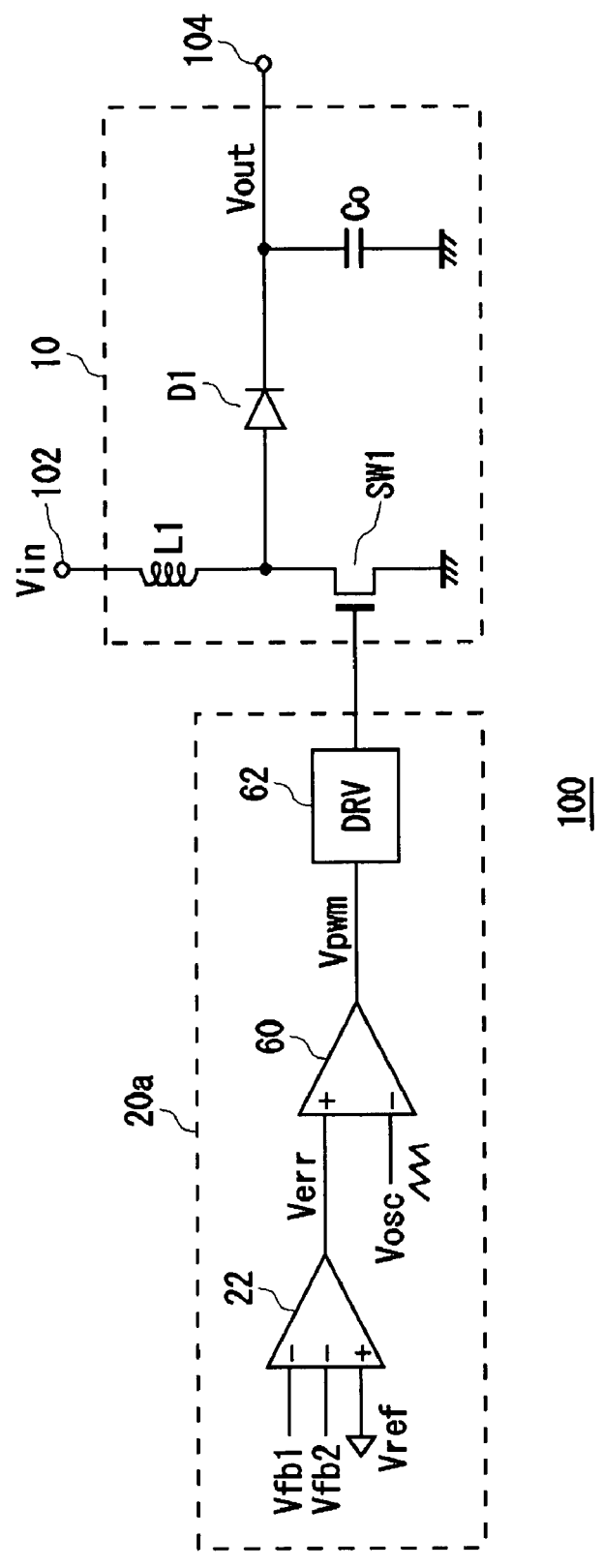
FIG. 3 is a circuit diagram showing a configuration of a power supply apparatus employing a switching regulator as a voltage generation unit.

FIG. 3 is a circuit diagram in a case where a switching regulator is used as a voltage generation unit 10. In FIG. 3, the same constituent elements as those shown in FIG. 1 are not shown. The voltage generation unit 10 includes an inductor L1, a switching transistor SW1, a diode D1, and an output capacitor Co. One end of the inductor L1 is connected to the input terminal 102, and the input voltage Vin is applied to one end of the inductor L1. The switching transistor SW1 is provided between the other end of the inductor L1 and the ground. The diode D1 has an anode connected to a connection point between the inductor L1 and the switching transistor SW1, and a cathode connected to the output terminal 104. The output capacitor Co is provided between the output terminal 104 and the ground.

A control circuit 20a includes an error amplifier 22, a PWM (pulse width modulation) comparator 60, and a driver circuit 62. The error amplifier 22 amplifies an error between one of the first feedback voltage Vfb1 and the second feedback voltage Vfb2 and the reference voltage Vref, and outputs an error voltage Verr to the PWM comparator 60. The PWM comparator 60 compares a periodic signal Vosc in either a triangular waveform or a sawtooth waveform output from an oscillator with the error voltage Verr, and generates a PWM signal $V_{pmw}$ for which a time ratio of high level to low level changes according to a magnitude relationship between the error signal Verr and the period signal. The driver circuit 62 controls the switching transistor SW1 to be turned on or off based on the PWM signal $V_{pmw}$.

The control circuit 20a generates the driving voltage Vout so that the error between one of the first feedback voltage Vfb1 and the second feedback voltage Vfb2 and the reference voltage Vref becomes zero. Therefore, the same advantages as those of the control circuit 20 shown in FIG. 1 can be obtained.

In the embodiment, the error amplifier 22 including the two differential pairs amplifies the error between the lower voltage of the first feedback voltage Vfb1 and the second feedback voltage Vfb2 and the reference voltage Vref. However, the present invention is not limited to the embodiment. For example, the control circuit 20 may be configured to include a minimum-value circuit that outputs the lower voltage of the first feedback voltage Vfb1 and the second feedback voltage Vfb2, and to include an error amplifier that amplifies an error between an output of the minimum-value circuit and the reference voltage Vref.

In the embodiments, the instances in which the non-insulating switching regulator or the charge pump circuit is employed have been described. Alternatively, an insulating switching power supply or the like may be employed as the voltage generation unit 10.

In the embodiments, the instance in which one LED is employed as the load has been described. However, a plurality of LEDs may be similarly employed. As long as each of the LEDs is a circuit driven by the boosted voltage, the load is not limited to a specific circuit. Namely, voltages at both ends of the load are fed back as the first feedback voltage Vfb1 and the second feedback voltage Vfb2. Due to this, even if the voltage drop across the load; changes according to an operating state, one of the first feedback voltage Vfb1 and the second feedback voltage Vfb2 is stabilized. Therefore, it is possible to enhance the stability of the load circuit.

In the embodiments, the transistors employed in are FETs. Alternatively, transistors of the other type such as bipolar transistors may be employed. Selection of the type of the transistors may be decided according to design specifications required for the power supply apparatus or a semiconductor manufacturing process used.

In the embodiments, the constituent elements of the power supply apparatus 100 may be either integrated on a single substrate or part of the constituent elements may be constituted by discrete elements. Which elements are to be integrated may be decided according to cost, occupation area or the like.

While the preferred embodiments of the present invention have been described using specific terms, such description is for illustrative purposes only, and it is to be understood that changes and variations may be made without departing from the spirit or scope of the appended claims.

What is claimed is:

1. A power supply apparatus comprising:
 a voltage generation unit generating a driving voltage for driving a load;
 a first feedback path feeding back a voltage according to a voltage at one end of the load;
 a second feedback path feeding back a voltage according to a voltage at the other end of the load; and
 a control circuit controlling the voltage generation unit so that one of a first feedback voltage and a second feedback voltage fed back by the first feedback path and the second feedback path, respectively is closer to a predetermined reference voltage;
 wherein the control circuit includes an error amplifier amplifying an error between one of the first feedback voltage and the second feedback voltage and the reference voltage, and adjusts the driving voltage so that the error is closer to zero, and
 the error amplifier includes two input differential pairs, the reference voltage and the first feedback voltage being input to one of the two input differential pairs, and the reference voltage and the second feedback voltage being input to other input differential pair.

2. A power supply apparatus comprising:
 a voltage generation unit generating a driving voltage for driving a load;
 a current driving circuit provided on a path on which the voltage generation unit drives the load;
 a first feedback path feeding back a first feedback voltage according to the driving voltage;
 a second feedback path feeding back a second feedback voltage according to a voltage at a connection point between the current driving circuit and the load; and
 a control circuit controlling the voltage generation unit so that one of the first feedback voltage and the second feedback voltage fed back by the first feedback path and the second feedback path, respectively is closer to a predetermined reference voltage;
 wherein the control circuit includes an error amplifier amplifying an error between one of the first feedback voltage and the second feedback voltage and the reference voltage, and adjusts the driving voltage so that the error is closer to zero, and
 the error amplifier includes two input differential pairs, the reference voltage and the first feedback voltage being input to one of the two input differential pairs, and the reference voltage and the second feedback voltage being input to other input differential pair.

3. A power supply apparatus comprising:
 a voltage generation unit generating a driving voltage for driving a load;
 a first feedback path feeding back a voltage according to a voltage at one end of the load;
 a second feedback path feeding back a voltage according to a voltage at the other end of the load; and
 a control circuit controlling the voltage generation unit so that one of a first feedback voltage and a second feedback voltage fed back by the first feedback path and the second feedback path, respectively is closer to a predetermined reference voltage;
 wherein the first feedback path includes
 a constant current circuit generating a predetermined constant current; and
 a voltage drop circuit provided between the constant current circuit and the voltage generation unit, and generating a voltage drop according to the constant current, and
 the first feedback path feeds back the voltage at the connection point between the constant current circuit and the voltage drop circuit as the first feedback voltage.

4. A power supply apparatus comprising:
 a voltage generation unit generating a driving voltage for driving a load;
 a current driving circuit provided on a path on which the voltage generation unit drives the load;
 a first feedback path feeding back a first feedback voltage according to the driving voltage;
 a second feedback path feeding back a second feedback voltage according to a voltage at a connection point between the current driving circuit and the load; and
 a control circuit controlling the voltage generation unit so that one of the first feedback voltage and the second feedback voltage fed back by the first feedback path and the second feedback path, respectively is closer to a predetermined reference voltage;
 wherein the first feedback path includes
 a constant current circuit generating a predetermined constant current; and
 a voltage drop circuit provided between the constant current circuit and the voltage generation unit, and generating a voltage drop according to the constant current, and
 the first feedback path feeds back the voltage at the connection point between the constant current circuit and the voltage drop circuit as the first feedback voltage.

5. The power supply apparatus according to claim 3, wherein
 the voltage drop circuit includes a diode arranged on a path of the constant current so that a cathode of the diode is on a low voltage side.

6. The power supply apparatus according to claim 4, wherein
 the voltage drop circuit includes a diode arranged on a path of the constant current so that a cathode of the diode is on a low voltage side.

7. The power supply apparatus according to claim 3, wherein
 the voltage drop circuit includes a resistor provided on a path of the constant current.

8. The power supply apparatus according to claim 4, wherein
the voltage drop circuit includes a resistor provided on a path of the constant current.

9. The power supply apparatus according to claim 1, wherein
the voltage generation unit includes
a charge pump circuit; and
a regulator circuit regulating an input voltage or an output voltage of the charge pump circuit, and
the control circuit adjusts a control voltage for controlling a transistor of the regulator circuit so that one of the first feedback voltage and the second feedback voltage is closer to the reference voltage.

10. The power supply apparatus according to claim 2, wherein
the voltage generation unit includes
a charge pump circuit; and
a regulator circuit regulating an input voltage or an output voltage of the charge pump circuit, and
the control circuit adjusts a control voltage for controlling a transistor of the regulator circuit so that one of the first feedback voltage and the second feedback voltage is closer to the reference voltage.

11. The power supply apparatus according to claim 1, wherein
the voltage generation unit includes a switching regulator circuit, and
the control circuit adjusts a duty ratio of ON/OFF state of a switching transistor of the switching regulator circuit so that one of the first feedback voltage and the second feedback voltage is closer to the reference voltage.

12. The power supply apparatus according to claim 2,
the voltage generation unit includes a switching regulator circuit, and
the control circuit adjusts a duty ratio of ON/OFF state of a switching transistor of the switching regulator circuit so that one of the first feedback voltage and the second feedback voltage is closer to the reference voltage.

13. The power supply apparatus according to claim 1,
at least the first feedback path, the second feedback path, and the control circuit are integrated on one semiconductor substrate.

14. An electronic device comprising
a light emitting element, and
the power supply apparatus according to claim 1 driving the light emitting element as the load.

15. The power supply apparatus according to claim 2,
at least the first feedback path, the second feedback path, and the control circuit are integrated on one semiconductor substrate.

16. An electronic device comprising
a light emitting element, and
the power supply apparatus according to claim 2 driving the light emitting element as the load.

* * * * *